United States Patent [19]
Boursier et al.

[11] Patent Number: 5,675,333
[45] Date of Patent: Oct. 7, 1997

[54] DIGITAL COMPRESSED SOUND RECORDER

[75] Inventors: Alain Boursier, Le Mans; Louis Giron, Mulsanne; Bruno Lozach, Servon; Estelle Boursicaut, Montrouge, all of France

[73] Assignee: U.S. Philips Corporation, New York, N.Y.

[21] Appl. No.: 520,448

[22] Filed: Aug. 29, 1995

[30] Foreign Application Priority Data

Aug. 31, 1994 [FR] France ................... 94 10490

[51] Int. Cl.$^6$ ............................................. H04B 14/04
[52] U.S. Cl. ............................. 341/87; 360/12; 379/88
[58] Field of Search ...................... 341/87, 110; 379/88, 379/214; 360/12

[56] References Cited

U.S. PATENT DOCUMENTS 5,506,872  4/1996  Mohler ..................... 375/240

*Primary Examiner*—Jeffrey A. Gaffin
*Assistant Examiner*—Peguy Jean Pierre
*Attorney, Agent, or Firm*—Steven R. Biren

[57] ABSTRACT

For saving memory space, the use of a sophisticated compressor is to be preferred to a simple reduction of the sampling frequency. However, for very high compression rates the total number of calculations is such that the compressor would no longer be capable of following the timing with which the samples arrive. Particularly in the case of a telephone/recorder where sound messages are received in separate call elements of limited duration, the invention consists of finally compressing once again samples that one has not been able to compress in real time at a sufficiently high compression rate.

8 Claims, 1 Drawing Sheet

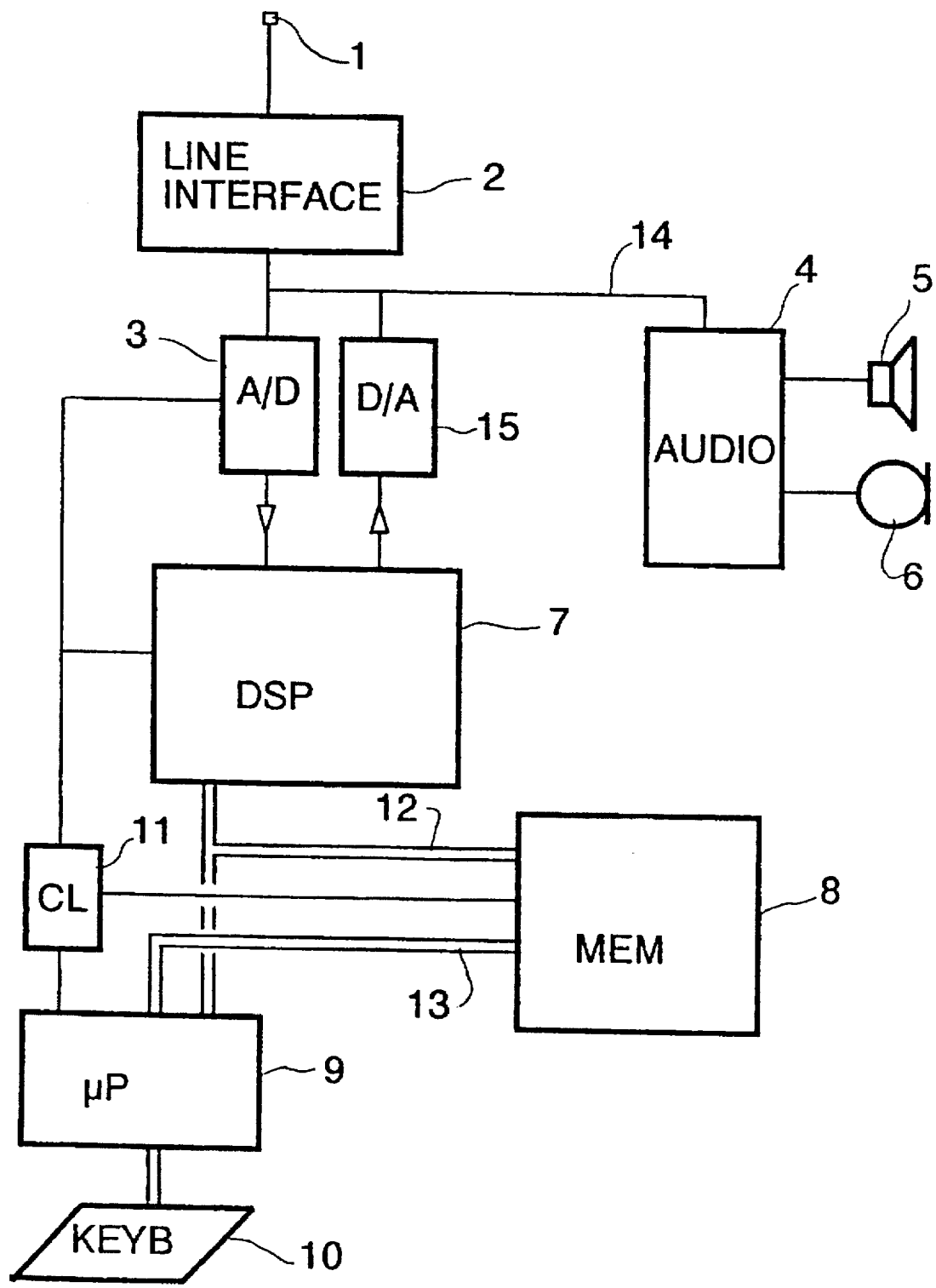

DIGITAL COMPRESSED SOUND RECORDER

FIELD OF THE INVENTION

The present invention relates to a sound recorder, comprising an analog/digital converter, a memory for recording digital sound samples, and a microprocessor for particularly controlling reading, erasing, or entering said samples from/in the memory as well as changing the compression rate of the samples to be recorded in the memory.

BACKGROUND OF THE INVENTION

A recorder of this type is known from the abstract of JP Kokai 2-78058 (Konika Corp.) This document relates to a sound recorder in which an analog/digital converter produces samples to be recorded in a memory. To increase the length of the messages which it can record in the memory, the sampling frequency of the analog/digital conversion is reduced when the memory is filled to beyond a certain threshold. This method has the drawback that all the recorded data do not have the same quality; it depends on the sampling frequencies with which they have been recorded. Furthermore, if an increased compression rate is obtained by simply reducing the sampling frequency, this reduction degrades the quality of the recorded messages.

SUMMARY OF THE INVENTION

The invention provides a digital recorder which has an improved possible recording length as well as a better quality of the recorded messages and which can process all these messages in the same manner.

A recorder according to the invention is characterized in that it comprises two separate compression devices for compressing the samples coming from the analog/digital converter, the two devices operating on the basis of an equal number of samples taken per unit of time, while the first device produces signals compressed at a first compression rate and the second device produces signals compressed at a second, higher, compression rate, and the microprocessor comprises first means for compressing by the first compression device digital incoming samples while the lower compression rate is used, and for entering compressed samples in the memory as soon as their compression is fulfilled, and second means for reading from the memory samples that have previously been entered, so as to apply the samples to the second compression device, so that they are compressed once again, this time at the higher compression rate, as a replacement of the less-compressed samples.

The use of a sophisticated compression device is to be preferred to a simple reduction of the sampling frequency. However, with such a device, the higher the compression rate used, the longer it will take to realize the compression, because it is difficult (which implies many calculations) to compress much while safeguarding a maximum signal quality. For very high rates it may even happen that the device can no longer follow the incoming rate of the samples. For example, the compression of a one-minute message may take thirty minutes to be effected. The invention is thus based on the idea of finally compressing again that which one has not been able to compress in real time.

In a particular embodiment, the two compression devices are formed by software loaded in a signal processor (DSP).

A first method to be implemented in a sound recorder according to the invention, intended for sound messages received in separate elements, each of limited duration, is characterized in that, when a sound message is being received, the microprocessor utilizes the first means until the end of the running element has been received while the first compression device compresses incoming digital samples and enters them in the memory after which, when the current element has been recorded completely, it re-reads the element that has just been received and applies thereof the samples to the second compression device so that they are compressed at the higher compression rate, and it enters in the memory the samples of this element compressed at a higher rate, by replacing less compressed samples. After a period of time, the memory thus contains only samples compressed at the highest compression rate.

In a second method also to be implemented in a sound recorder according to the invention, intended for sound messages received in separate elements each of limited duration, the microprocessor utilizes the first means when the memory filling is lower than a given percentage, and when the memory filling exceeds said given percentage it waits until the end of the current element has been received and then controls all the samples previously contained in the memory to be taken again and applied to the second compression device so that they are compressed once again, but at a higher compression rate and, finally, enters samples compressed at a higher rate in the memory while replacing less compressed samples.

With this method, as long as the filling remains low, only the lowest compression rate is used, which provides a better quality when the messages are recovered.

Advantageously, the microprocessor first implements said second method and after this, when the filling of the memory has exceeded a given percentage, and all the samples which have been re-read and entered in the memory in a form compressed at a higher rate, it implements the first method for subsequent messages.

A telephone responder/recorder advantageously comprises a sound recorder according to the invention whose microprocessor is programmed for implementing a method according to the invention.

BRIEF DESCRIPTION OF THE DRAWING

These and other aspects of the invention will be apparent from and elucidated with reference to the embodiments described hereinafter. The sole FIGURE diagrammatically represents the components of a telephone recorder/responder according to the invention.

DESCRIPTION OF PREFERRED EMBODIMENTS

The telephone recorder/responder of FIG. 1 comprises a digital sound recorder. An input 1 is connected to a telephone line which transports messages in analog form, generally sound or speech signals. These signals are transmitted via a line interface module 2 from the line to the analog/digital converter 3 or, in the other direction, from the digital-to-analog converter 15 to the line. The interface module 2 comprises known rectifier and/or protection elements which do not relate to the invention. The output of the line interface module on the side of the analog/digital converter is also connected by a bidirectional connection 14 to the audio processing circuit 4 which feeds a loudspeaker or receiver 5 and receives signals from a microphone 6.

The telephone recorder/responder further comprises a microprocessor 9, a signal processor 7 and a memory 8 which are specifically, although not exclusively, intended to form a digital sound recorder. The converted signals having a frequency fixed by the analog/digital converter 3 are led to the digital signal processor 7 of a type known by the name of DSP (Digital Signal Processor). Such a digital signal processor has a specialized architecture to facilitate the digital real-time calculations. Typically, a DSP is a high-speed device with a small set of instructions, which is capable of performing limited tasks (such as arithmetic tasks) in a much faster way than a microprocessor which is more comprehensive but much slower. Its architecture is determined, in essence, by the search for the highest computing speed, to the detriment of programming convenience and above all of the memory capacity especially the program memory. The processor 7 comprises speech signal compression software of a known type, for example, of the family denoted by the word CELP. In the software of this family there are various levels of complexity. One may thus choose between various types of software which have different compression levels to each of which corresponds a saving of memory area and a given calculation period. The processor 7 includes two known software programs which may be called at will. One of them produces signals compressed at a first compression rate, which yields, for example, 8 kbits per second for the compressed signal, and the other type of software produces signals compressed at a second, higher, compression rate, which yields, for example, 5 kbits per second for the compressed signal. The digital samples representing the compressed signals produced by the processor 7 are transmitted to memory 8 by a data bus 12. The microprocessor 9 is connected to the memory 8 by an address bus 13 which indicates the location at which the memory is to be read or written, and carries the corresponding read/write signal. As the microprocessor manages the addresses of the memory 8, it obviously contains data which make it possible for the microprocessor to know the filling of the memory. The microprocessor is further connected by the data bus 12 to the signal processor 7. This makes it possible for the microprocessor to control the program printer of this processor to choose one type of compression software or the other.

All this permits the microprocessor 9 to control reading, erasing, or recording of compressed signal samples from/in the memory as well as to select the compressibility of the samples to be recorded therein. A clock 11 is supplied to all the components of the compression system (processor 7, microprocessor 9, analog/digital converter 3 and digital/analog converter 15) so as to synchronize them. Of course, the DSP has an internal cycle time which is much shorter than the period of the clock 11 (it possesses a specific clock (not shown) whose frequency is a multiple of that of clock 11) so as to perform a large number of compression calculation operations between the arrivals of two successive samples which come from the analog/digital converter 3. The rate at which the samples coming from the analog/digital converter 3 arrive is, for example, 8 to 12 bits about every 125 µs.

The microprocessor 9 comprises a program for controlling the compression of the digital samples coming in from the analog/digital converter 3, by utilizing the first type of compression software of the DSP 7 (smallest compression rate) and for writing in the memory, as soon as their compression is fulfilled, the compressed samples coming from the DSP. The microprocessor 9 also comprises a program for controlling the reading of previously written samples from the memory so as to have them processed by the second compression software of the DSP for obtaining samples that are compressed at a higher compression rate, for writing in the memory the samples thus compressed, and for suppressing the samples they replace which are less compressed. In a telephone responder the recording messages to be recorded are normally of limited duration, worded differently, the sound messages are received in separate call elements each of limited duration, between which the recorder does not receive messages.

The selected model of DSP is thus to have a speed so that, when the first compression rate is used, the mean calculation time of the compression of a sample lasts at most one clock cycle 11, that is to say, the time between the presentation of two samples. In contrast, in the case of the second type of compression software, which has a higher rate, the calculation time is longer and the DSP cannot compress the samples at their rate of arrival.

To overcome this impediment, in a first variant the microprocessor is programmed for using the first software of the processor 7 during the reception of a message, and continuing as long as the message lasts, the compression via the first compression software of the arriving digital samples and writing them in the memory thereafter when the current conversation element has been completely recorded (which is signalled by the fact that the handset is on-hook, which is obviously known to the microprocessor 9), for controlling the reading of samples of the conversation element that has just been received and processing them by the DSP which utilizes the second compression software, so that they are compressed at the higher compression rate, and for writing in the memory the samples of this conversation element which are compressed at a higher rate, after which the microprocessor suppresses the samples which are less compressed and which they replace. The less compressed previous data are not destroyed until they have been compressed at the highest rate. In fact, an interruption could occur during the processing, for example, a breakdown of the mains or a new telephone call requiring an immediate recording. In such a case the processing is interrupted to be resumed thereafter, and the old data are integrally maintained until the processing can be terminated.

In a second variant, the microprocessor is programmed to utilize the first software of the processor 7 as long as the filling of the memory is lower than a given percentage (for example, 80%), and when the filling of the memory exceeds said given percentage, to wait until the current element has been received and then control the reading of all the samples previously recorded and their processing by the DSP which utilizes the second compression software, so that they are compressed again at the higher compression rate, and to write the samples that have been compressed at a higher rate in the memory on the basis of the zero address of the memory. As this has already been explained hereinbefore, the previous data are not destroyed until the compression process has been completed. If, for example, the compression at the second rate provides samples which occupy 60% of the area occupied by samples compressed at the first rate, and the second compression of all the previously recorded samples is triggered when the memory is filled to 80%, it will turn out to be filled to only 48% after this operation. From this moment on, all the received messages will be compressed again after each reception, one by one, according to the principle explained above (first variant).

The processor DSP 7 obviously also includes two types of digital sample decompression software corresponding respectively, to the provided compression software and microprocessor 9 if one part of the memory 8 is recorded at one rate and another part at another rate, provides for changing the decompression software at the desired instant while messages are being read.

A keypad 10 allows the use of the handshake facility with the microprocessor 9 in a known manner, to control the set, for example, to put the responder in or out of service, to control the reading of messages, their erasure and so on.

What is claimed is:

1. Sound recorder, comprising an analog/digital converter, a memory for recording digital sound samples, and a microprocessor for particularly controlling reading, erasing, or entering said samples from/in the memory as well as changing the compression rate of the samples to be recorded in the memory, characterized in that it comprises two separate compression devices for compressing the samples coming from the analog/digital converter, the two devices operating on the basis of an equal number of samples taken per unit of time, the first device producing signals compressed at a first, lower, compression rate and the second device producing signals compressed at a second, higher, compression rate, the microprocessor comprising:

first means for compressing by the first compression device digital incoming samples while using the lower compression rate, and for entering compressed samples in the memory as soon as their compression is fulfilled; and second means for reading from the memory samples that have previously been entered, and applying the samples to the second compression device, so that they are compressed once again, this time at the higher compression rate, as a replacement of the less-compressed samples.

2. Sound recorder as claimed in claim 1, characterized in that the two compression devices are formed by software loaded in a signal processor (DSP).

3. Telephone responder/recorder, characterized in that it comprises a sound recorder as claimed in claim 1.

4. Telephone responder/recorder as claimed in claim 3, characterized in that the microprocessor of the recorder comprises a program unit that makes it possible to use the following method:

when a sound message is being received, the microprocessor utilizes the first means until the end of the running element has been received while the first compression device compresses incoming digital samples and enters them in the memory after which, when the current element has been recorded completely, it re-reads the element that has just been received and applies thereof the samples to the second compression device so that they are compressed at the higher compression rate, and it enters in the memory the samples of this element, compressed at a higher rate, by replacing less-compressed samples.

5. Telephone responder/recorder as claimed in claim 3, characterized in that the microprocessor of the recorder comprises a program unit that makes it possible to use the following method:

the microprocessor utilizes the first means when the memory filling is lower than a given percentage, and when the memory filling exceeds said given percentage it waits until the end of the current element has been received and then controls all the samples previously contained in the memory to be taken again, and applied to the second compression device so that they are compressed once again, but at the higher compression rate and, finally, enters samples compressed at the higher rate in the memory while replacing less compressed samples.

6. Method used in a sound recorder intended for sound messages received in separate elements, each of limited duration, the sound recorder comprising an analog/digital converter, a memory for recording digital sound samples, and a microprocessor for particularly controlling reading, erasing, or entering said samples from/in the memory as well as changing the compression rate of the samples to be recorded in the memory, characterized in that it comprises two separate compression devices for compressing the samples coming from the analog/digital converter, the two devices operating on the basis of an equal number of samples taken per unit of time, the first device producing signals compressed at a first, lower, compression rate and the second device producing signals compressed at a second, higher, compression rate, the microprocessor comprising:

first means for compressing by the first compression device digital incoming samples while using the lower compression rate, and for entering compressed samples in the memory as soon as their compression is fulfilled; and second means for reading from the memory samples that have previously been entered, and applying the samples to the second compression device, so that they are compressed once again, this time at the higher compression rate, as a replacement of the less-compressed samples, the method being characterized in that, when a sound message is being received, the microprocessor utilizes the first means until the end of the running element has been received while the first compression device compresses incoming digital samples and enters them in the memory after which, when the current element has been recorded completely, it re-reads the element that has just been received and applies thereof the samples to the second compression device so that they are compressed at the higher compression rate, and it enters in the memory the samples of this element, compressed at the higher rate, by replacing less-compressed samples.

7. Method used in a sound recorder intended for sound messages received in separate elements each of limited duration, the sound recorder comprising an analog/digital converter, a memory for recording digital sound samples, and a microprocessor for particularly controlling reading, erasing, or entering said samples from/in the memory as well as changing the compression rate of the samples to be recorded in the memory, characterized in that it comprises two separate compression devices for compressing the samples coming from the analog/digital converter, the two devices operating on the basis of an equal number of samples taken per unit of time, the first device producing signals compressed at a first, lower, compression rate and the second device producing signals compressed at a second, higher, compression rate, the microprocessor comprising;

first means for compressing by the first compression device digital incoming samples while using the lower compression rate, and for entering compressed samples in the memory as soon as their compression is fulfilled; and second means for reading from the memory samples that have previously been entered, and applying the samples to the second compression device, so that they are compressed once again, this time at the higher compression rate, as a replacement of the less-compressed samples, the method being characterized in that the microprocessor utilizes the first means when the memory filling is lower than a given percentage, and when the memory filling exceeds said given percentage it waits until the end of the current element has been received and then controls all the samples previously contained in the memory to be taken again, and applied to the second compression device so that they are compressed once again, but at the higher compression rate and, finally, enters samples compressed the a higher rate in the memory while replacing less-compressed samples.

8. Method of claim 4, comprising that, at the end, when the filling of the memory has exceeded a given percentage, and all the samples which have been re-read and entered in the memory in a form compressed at the higher rate, the following method is implemented for subsequent messages: when a sound message is being received, the microprocessor utilizes the first means until the end of the running element has been received while the first compression device compresses incoming digital samples and enters them in the memory after which, when the current element has been recorded completely, it re-reads the element that has just been received and applies thereof the samples to the second compression device so that they are compressed at the higher compression rate, and it enters in the memory the samples of this element, compressed at the higher rate, by replacing less-compressed samples.

* * * * *